2,862,827

CERAMIC BODIES AND METHODS FOR PRODUCING SAME

Joseph Boyce, Beaver Falls, and Karl Kautz, Pittsburgh, Pa., assignors to Vitro Corporation of America, Verona, N. J.

No Drawing. Application May 20, 1954
Serial No. 431,275

7 Claims. (Cl. 106—39)

Our invention relates to ceramic bodies and methods for making the same.

Ceramic bodies such as floor and wall tiles are produced by dry pressing or extruding known ceramic mixtures of flux, minerals, plasticizers and the like into tiles of desired shape. These preformed tiles are dried, glazed if necessary, and then loaded into rows on separate tiers which are then stacked into saggers. The loaded saggers are subsequently fired to high temperatures for an extended period in car tunnel kilns and then are allowed to cool.

Ceramic bodies of the type generally referred to as artware are produced by first preparing a liquid slip from similar known ceramic mixtures. The slip is then poured into a suitably shaped plaster mold to produce preformed bodies of the desired shape. The preformed bodies are then removed from the mold, dried, and then fired in the manner indicated previously.

Ceramic bodies of the type generally referred to as dinnerware are produced by first preparing a soft mud from similar known ceramic mixtures. The mud is then jiggered on a potter's wheel to produce preformed bodies, which are then dried and fired in the same manner.

In all of the above processes, the firing temperatures range from between 1800° to 2400° F., and the combined heating and cooling period, defined as the firing cycle period, ranges between 1 to 4 days.

All of the above processes, due to the high firing temperatures and the extended firing cycle periods, are inherently expensive. Moreover, for quantity production, large firing kilns are used. The temperatures within this type of kiln are not easily controllable to a tolerance smaller than ±25° F. Consequently, large temperature gradients are established within the kiln, causing color variation, warpage, uneven shrinkage, and similar undesirable changes in the bodies being fired; a high rejection rate often results.

It is an object of the present invention to provide new ceramic bodies which can be fired at low firing temperatures and for short firing cycle periods.

Another object is to provide new processes for producing ceramic bodies at low firing temperatures and with short firing cycle periods.

Still another object is to provide a novel premelted, finely divided glass-like flux adapted to be used in the formation of ceramic bodies.

Yet another object is to provide a new process for producing flux adapted to be used in the formation of ceramic bodies.

Still a further object is to provide a new process for firing ceramic bodies in a conveyor belt furnace.

We have discovered that when fluxes selected from the class composed of lead-bearing, zinc-bearing, and alkali-alkaline earth-bearing silicates, borosilicates, and fluoborosilicates are premelted to form viscous glasses, fritted by quenching in water and then comminuted, for example, by ball milling, to reduce the average particle diameter to micron or sub-micron size, certain novel effects become apparent.

More particularly, the melting temperature of the premelted, finely divided glass-like flux is reduced and ranges between 700° and 1600° F., depending on the actual flux composition. When this flux is mixed with certain known ceramic-forming inorganic compounds to produce preformed bodies through use of any of the processes described previously, and these bodies are fired at temperatures intermediate the melting temperature of the flux and the melting temperature of the ceramic-forming inorganic compounds, excellent quality bodies can be produced at firing temperatures within the range from 1000° to 1600° F. and with firing cycle periods within the range from 5 to 120 minutes.

These ceramic-forming inorganic compounds must have a melting temperature which exceeds the firing temperature and can be, for example, minerals of the oxide or silicate type, or processed compounds such as metal oxides, silicates, phosphates, sulfates, titanates and the like. Such compounds are well known to the art.

The percentage by weight of flux in the flux-inorganic compound mixture must range between 5% and 60% and preferably should range between 30% and 50%. The percentage by weight of the inorganic compounds must range between 95% and 40%. These proportions can be suitably varied within these ranges to enable the addition, when necessary, of plasticizers, such as bentonite, in proportions up to 10% by weight.

The preformed ceramic bodies of this novel composition can be fired in a woven wire conveyor belt furnace such as a lehr, or in a decorating kiln or similar device to temperatures falling within the 1000° to 1600° F. range. The firing cycle periods will range between 5 and 120 minutes depending upon the firing temperatures used.

Furnaces of this type are accurately controllable in temperature to tolerances on the order of ±5° F. When an endless belt conveyor arrangement is used, the bodies to be fired are placed in a single layer. Under these conditions, color changes, warpage, and the like, are substantially eliminated and the rejection rate is sharply reduced.

Dry pressed or soft-mud pressed bodies of this type can also be fired while in a mold with the same satisfactory results.

The following examples set forth certain well-defined instances of the application of this invention. They are, however, not to be considered as limitations thereof, since many modifications can be made without departing from the spirit and scope of this invention.

Example I

Lead borosilicate flux having the following composition:

| Material: | Percent by weight |
|---|---|
| Lead oxide | 74.95 |
| Boron oxide | 13.59 |
| Silicon dioxide | 11.46 | was premelted to a glass, fritted and ground to an average particle size of 2 microns.

A dry ceramic composition containing 30% by weight of this flux, 60% by weight of wollastonite and 10% by weight of kaolin was prepared. This composition was thoroughly mixed, with 10% by weight of water being added during the mixing operation. The resulting mixture was formed in a 4 inch by 4 inch mold, and compressed at a pressure of 500 p. s. i., to produce a wall tile having the dimensions 4 inches by 4 inches by ⅛ inch. This tile was dried and then fired in a lehr to a temperature of 1350° F. until the entire tile attained this temperature. The tile was allowed to cool in the lehr until the tile attained a temperature of about 500° F., at which point the tile was removed from the conveyor belt. The tile was held at the peak temperature for about 15 minutes.

Very little shrinkage was observed and the tile thus produced had an absorption of about 15% and was of excellent commercial quality.

A number of such tiles were produced in this manner. There was no warpage.

*Example II*

A wall tile of the composition indicated in Example I was formed under pressure in a 4 inch by 4 inch mold. The mold was then electrically heated with the tile remaining in the mold until the entire tile attained a temperature of 1350° F. The tile was then removed from the mold. The tile quality was substantially the same as in Example I.

*Example III*

An alkali-alkaline earth-zinc oxide fluo-borosilicate type flux having the following composition:

| Material: | Percent by weight |
|---|---|
| Sodium oxide | 4.84 |
| Potassium oxide | 7.20 |
| Zinc oxide | 9.03 |
| Boron oxide | 1.54 |
| Aluminum oxide | 8.55 |
| Silicon dioxide | 61.22 |
| Calcium fluoride | 7.62 | was premelted to a glass, fritted and ground to an average particle size of 3 microns.

A ceramic composition containing 35% by weight of this flux, 35% by weight of feldspar and 30% by weight of a mixture of china and ball clays was preformed into a tile and fired at a temperature of 1400° F. using the same procedures outlined in Example I.

This tile had about 2% shrinkage, with about 15% absorption and a wall tile of excellent commercial quality was produced.

*Example IV*

A powder containing about 50% by weight of the flux described in Example III, 10% of nepheline-syenite, 15% of china clay, 25% of ball clay, 0.7% of sodium silicate, and 0.1% of sodium carbonate was prepared. One part by weight of water and 3 parts by weight of this powder were blunged together to form a liquid slip.

The slip was poured into tumbler-shaped plaster molds and allowed to cast for 30 minutes. The preformed tumblers were then removed from the molds, after partially drying for 30 minutes, and then completely dried for a period of 24 hours.

The dried preformed tumblers were then fired in a conveyor belt furnace at a temperature of 1400° F. The tumblers were allowed to cool to a temperature of 500° F. before removal from the furnace. The tumblers were held at peak temperature for a period of 15 minutes.

*Example V*

| Material: | Percent by weight | |
|---|---|---|
| Potassium oxide | 0.04 | |
| Sodium oxide | 16.65 | |
| Calcium oxide | 4.65 | Soda lime glass |
| Aluminum oxide | 0.33 | |
| Silicon dioxide | 74.1 | |
| Magnesium oxide | 3.23 | | was premelted to a glass, fritted, and ground to an average particle size of 5 microns.

A ceramic composition containing about 50% by weight of this flux, 10% by weight of nepheline-syenite, 20% by weight of china clay, 20% by weight of ball clay (a plasticizer) was wet mixed, and pugged for about one hour to a soft mud consistency.

This material was then extruded into a preformed tile body having the same dimensions as in the above examples and, after drying, fired at a temperature of 1500° F. in a furnace or mold to produce low shrinkage tile of excellent commercial quality. The tile was held at peak temperature for a period of 20 minutes.

A number of such tiles was produced in this manner. The shrinkage was about 2% and the absorption about 15%. No warping was noticeable on bisque specimen.

*Example VI*

The ceramic composition disclosed in Example I was mixed with water and pugged to a consistency of soft mud.

The mud was then jiggered on a potter's wheel to produce preformed dinner plates. These plates were dried in air, and then fired in a conveyor belt to a temperature of 1400° F. The plates were held at peak temperature for a period of 30 minutes.

Plates of excellent commercial quality were produced in this fashion.

While I have described and pointed out and illustrated the invention as applied to the above examples, many variations within the purview of this invention will be apparent to those skilled in the art and it is our intention not to be limited except as in the claims which follow.

We claim:

1. A ceramic powder having a firing temperature within the range from 1000 to 1600° F. consisting essentially of from about 40% to about 95% by weight of a ceramic-forming inorganic compound having a melting temperature in excess of the firing temperature and from about 60% to about 5% by weight of a previously melted and solidified, finely divided flux consisting of about 5% sodium oxide, about 7% potassium oxide, about 9% zinc oxide, about 1.5% boron oxide, about 8.5% aluminum oxide, about 61% silicon dioxide, and about 7.5% calcium fluoride, the said flux having a melting temperature below the firing temperature.

2. A ceramic powder in accordance with claim 1 in which the flux particles average not in excess of 5 microns in diameter.

3. A ceramic powder in accordance with claim 1 in which the ceramic-forming inorganic compound is a clay mineral.

4. A ceramic powder in accordance with claim 3 in which the clay mineral is kaolin.

5. A ceramic powder in accordance with claim 3 in which the clay mineral is wollastonite.

6. A ceramic powder in accordance with claim 3 in which the clay mineral is china clay.

7. A ceramic powder in accordance with claim 3 in whih the clay mineral is ball clay.

References Cited in the file of this patent

UNITED STATES PATENTS

| 2,018,600 | Brown | Oct. 22, 1935 |

FOREIGN PATENTS

| 253,184 | Great Britain | June 9, 1926 |